(No Model.) 2 Sheets—Sheet 1.

T. H. RUSHTON.
GEARING FOR IMPARTING DIFFERENTIAL MOTION IN MACHINERY.

No. 526,413. Patented Sept. 25, 1894.

Witnesses:
E. B. Bolton
H. van Oldenneel

Inventor:
Thomas Henry Rushton
By Richard R.
his Attorneys.

(No Model.) 2 Sheets—Sheet 2.
T. H. RUSHTON.
GEARING FOR IMPARTING DIFFERENTIAL MOTION IN MACHINERY.

No. 526,413. Patented Sept. 25, 1894.

Witnesses:
E. B. Bolton
H. van Olden...

Inventor:
Thomas Henry Rushton
By Richards
his Attorneys.

UNITED STATES PATENT OFFICE.

THOMAS HENRY RUSHTON, OF BOLTON, ENGLAND.

GEARING FOR IMPARTING DIFFERENTIAL MOTION IN MACHINERY.

SPECIFICATION forming part of Letters Patent No. 526,413, dated September 25, 1894.

Application filed January 17, 1894. Serial No. 497,203. (No model.) Patented in England June 20, 1893, No. 12,097.

*To all whom it may concern:*

Be it known that I, THOMAS HENRY RUSHTON, machine-maker, a subject of the Queen of Great Britain, residing at Kay Street Works, Bolton, in the county of Lancaster, England, have invented certain new and useful Improvements in Gearing for Imparting Differential Motion in Flier-Frames and Machinery for Preparing Fibrous Materials, (for which I have obtained a patent in Great Britain, numbered 12,097, bearing date June 20, 1893,) of which the following is a specification.

The objects of my invention are to simplify and arrange in a novel combination and to provide improved means of lubricating certain gearing or mechanism for imparting a differential motion in what are known as flier frames for preparing cotton and other fibrous materials previous to the spinning operation.

My invention is similar in purpose to that shown in British patent, No. 11,938, of 1888, to Haworth *et al*, and is designed to secure a more perfect action than is accomplished by the arrangement of the said patent.

Figure 1:
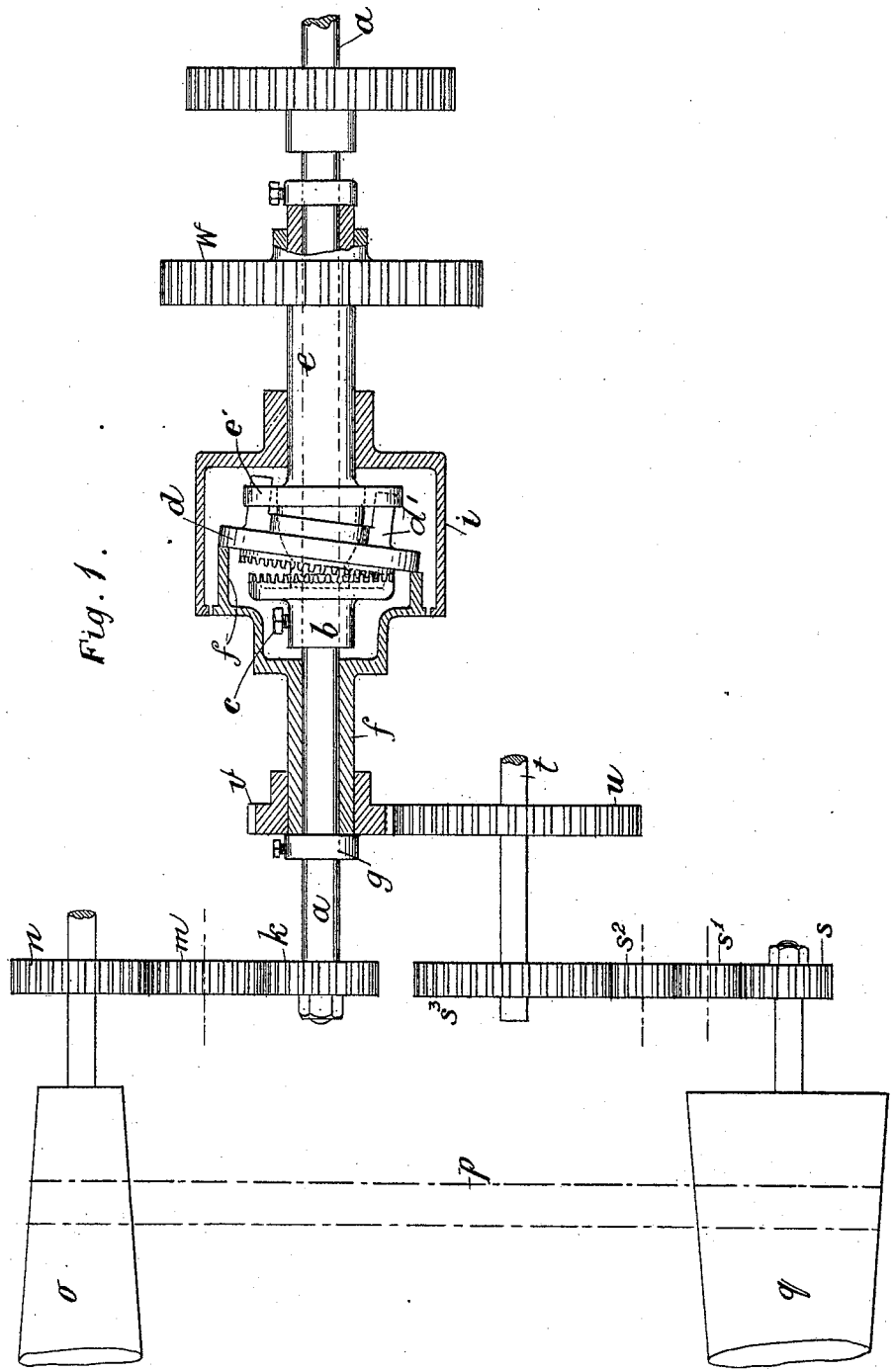
Figure 2:
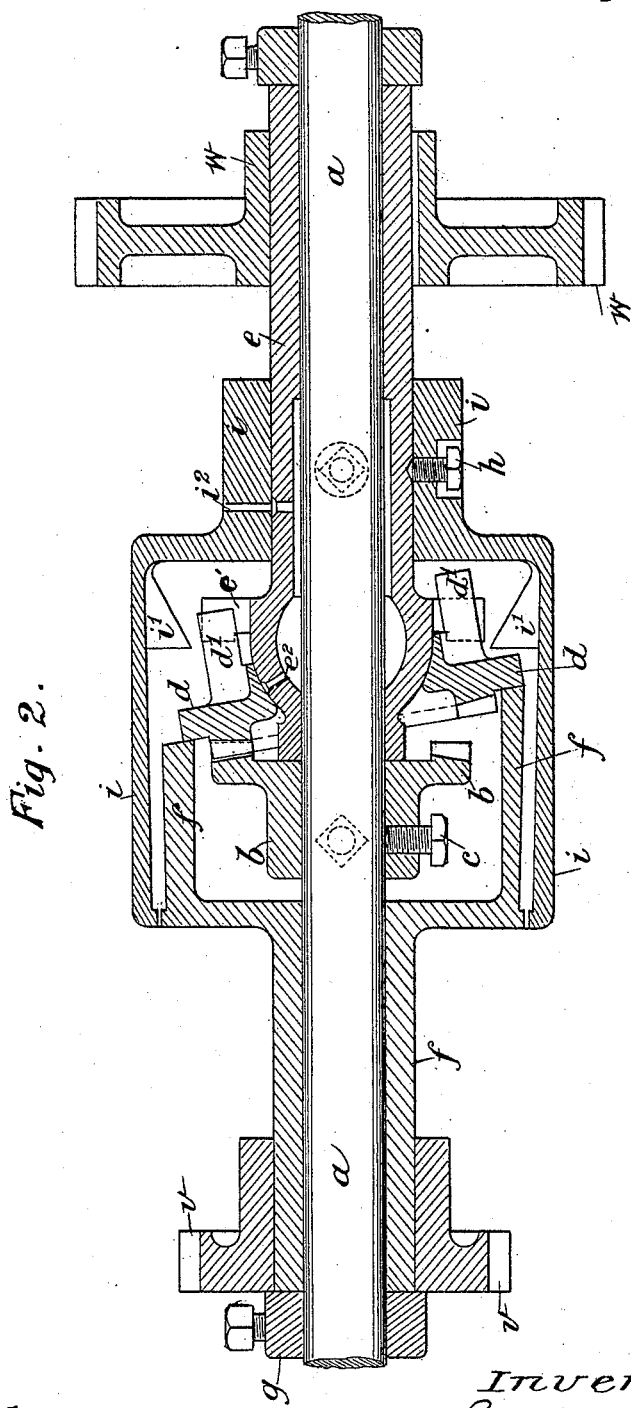

Referring to the accompanying drawings forming part of this specification Figure 1 is a sectional elevation of my improved differential gearing and so much only of a flier frame as is necessary to illustrate the application of said gearing to the same, and Fig. 2 is a sectional elevation showing the differential gearing in detail.

The differential gearing is carried by the driving shaft $a$ of the machine, and consists of the following parts:—A toothed wheel $b$ is fixed upon the driving shaft $a$ preferably by means of a nipping screw $c$ as shown, and at one point gears into a toothed disk $d$ which has its teeth set in a ring eccentrically and diagonally to the axis of the shaft $a$, the number of teeth in the ring being greater than the number of teeth on the wheel $b$. The interior of the disk $d$ is cupped and fashioned to fit at the required angle upon the ball shaped portion of a long boss $e$ which is mounted loose upon the shaft $a$. The disk $d$ is maintained in its proper working position upon the ball of the boss $e$ by means of a flanged sleeve $f$ the flanged portion of which is cut off at an angle corresponding to the inclination of the disk $d$ to the shaft $a$. The flanged sleeve $f$ is mounted loose and is maintained in its proper position upon the shaft $a$ by means of a fixed collar $g$. The disk $d$ has formed or fixed on its back studs $d'$ which engage with corresponding slots in a flange $e'$ on the boss $e$. Fastened on the boss $e$ by a nipping screw $h$ is a cover $i$ which extends over and incloses the whole mechanism so as to exclude dust and dirt. On the inside of this cover $i$ near one end are a number of inclined wings or fins $i'$, and the inside of the cover $i$ is inclined or tapered being larger in diameter at that end in which the wings $i'$ are placed. A hole $i^2$ for the reception of oil is made through the boss of the cover $i$, and extends through the boss $e$ into the interior of the same, which is made hollow for part of its length in order to diminish friction and facilitate lubrication. The oil poured through the hole $i^2$ flows through the hollow portion of the boss $e$, and through a hole $e^2$ in the ball portion, whereby the bearing surfaces of the disk $d$ and ball are lubricated.

When the mechanism is in motion and owing to the inclination of the interior of the cover $i$ the oil therein is kept to the end largest in diameter, where it is most required and drips from the inclined wings $i'$ onto those working parts which require lubricating, whereby constant lubrication without waste is insured.

The mechanism is actuated in the usual way, that is to say, the motion of the driving shaft $a$ is communicated by the twist wheel $k$ and gears $m$, $n$, to the top cone $o$ which drives by a belt $p$ the bottom cone $q$ whence motion is transmitted by the train of gears $s$, $s'$, $s^2$, $s^3$, to the jack shaft $t$ which drives by a gear $u$, a pinion $v$ keyed on the sleeve $f$. The toothed wheel $b$, being fixed on the driving shaft $a$, drives the toothed disk $d$ which by its studs $d'$ drives the boss $e$ from which motion is transmitted to the bobbins in the usual way by gearing, not shown, from the wheel $w$ keyed on the boss $e$.

Oil may be introduced into the shell $i$ through any suitable port.

Having now particularly described and ascertained the nature of my said invention and in what manner the same is to be performed, I declare that what I claim, and desire to secure by Letters Patent of the United States, is—

1. In combination in a differential gearing, the driving shaft $a$, the toothed wheel $b$, the loose sleeve on the shaft having an inclined edge, the said toothed wheel $b$ located within the sleeve $f$, the toothed disk $d$ engaging the wheel $b$ and having its edge extended to bear on the inclined edge of the sleeve, the ball bearing upon which the disk $d$ turns, the sleeve $e$, the bobbin wheel and the connection between the toothed disk $d$ and the sleeve consisting of the projections on the rear face of the disk $d$ and the projections interlocking therewith and extending from the ball bearing, substantially as described.

2. In combination, in a gearing, the gear wheels, the shell $i$ tapered on its interior and having the wings $i'$ at its larger end to form drip points for the oil, said gearing being inclosed within the shell, substantially as described.

3. In combination in a gearing, the gearing $b$, $d$, the ball boss $e$, the shell inclosing said parts and having a tapered interior and the wings $i'$ at the larger end of the shell the said ball boss $e$ having an oil hole for the supply of oil substantially as described.

4. In combination, the driving shaft $a$, the toothed wheel $b$, secured thereon, the sleeve $f$ arranged loosely thereon and having its edge at an angle to the driving shaft, the toothed disk engaging the wheel $b$ and bearing on the inclined edge of the flange, the ball bearing upon which the disk $d$ turns, the sleeve $e$ connected to the ball bearing, the connections between the ball bearing and the disk $d$, the bobbin wheel on the sleeve $e$ and the means for driving the flanged sleeve $f$, said sleeve $e$ having an oil port leading into the hollow ball bearing and an oil port leading from the hollow ball to the bearing surface of the disk $d$ and said ball, substantially as described.

In witness whereof I hereunto set my hand in presence of two witnesses.

THOMAS HENRY RUSHTON.

Witnesses:
R. CECIL WINDER,
*Notary Public, Bolton.*
JAMES HENRY ELLISON,
*Clerk to R. Cecil Winder, Notary Public, Bolton.*